June 17, 1924.
A. J. PARCEL
1,498,116
TOWING DRAWBAR FOR AUTOMOBILES
Filed March 17, 1923
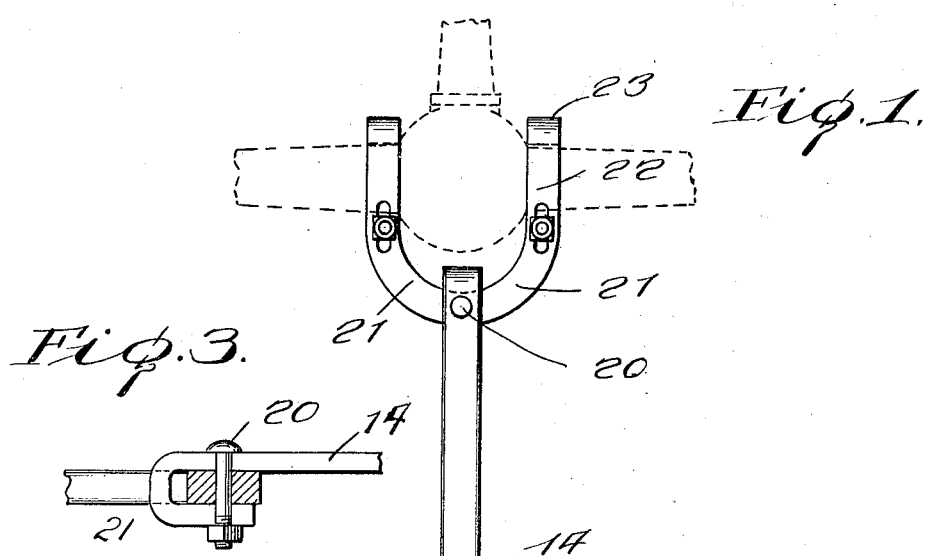
Fig. 1.
Fig. 3.
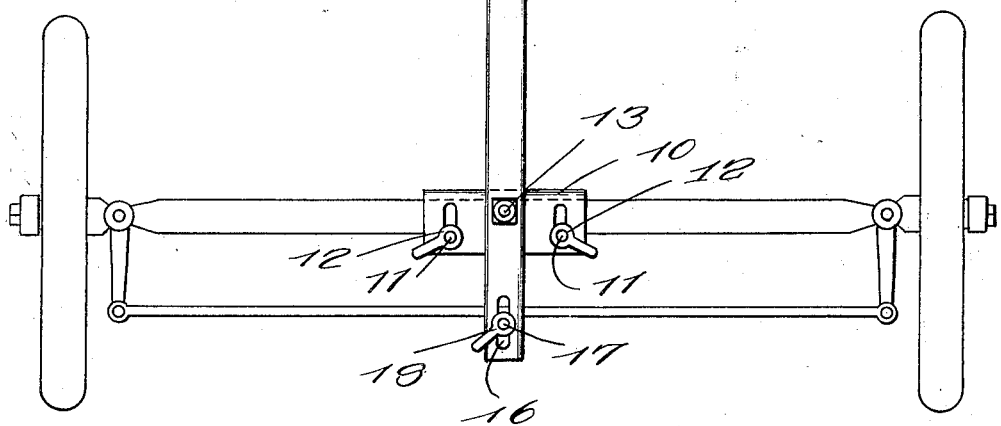
Fig. 2.
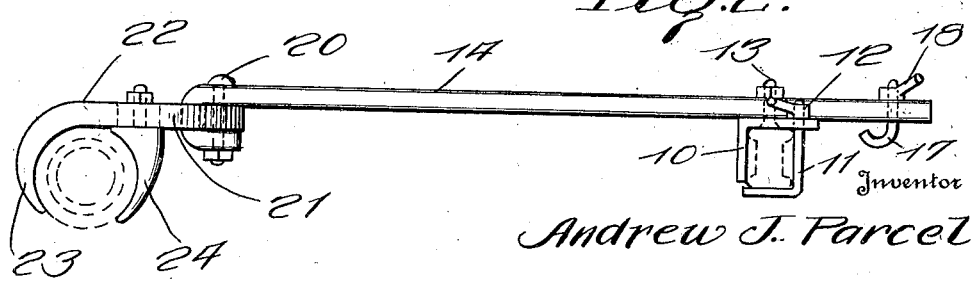
Inventor
Andrew J. Parcel
By Watson E. Coleman
Attorney Patented June 17, 1924.

1,498,116

UNITED STATES PATENT OFFICE.

ANDREW J. PARCEL, OF MAQUOKETA, IOWA.

TOWING DRAWBAR FOR AUTOMOBILES.

Application filed March 17, 1923. Serial No. 625,801.

*To all whom it may concern:*

Be it known that I, ANDREW J. PARCEL, a citizen of the United States, residing at Maquoketa, in the county of Jackson and State of Iowa, have invented certain new and useful Improvements in Towing Drawbars for Automobiles, of which the following is a specification, reference being had to the accompanying drawings.

This invention relates to devices for towing one automobile from another, and particularly to devices for this purpose so constructed that the towed machine will steer properly.

One of the objects of the invention is to provide a device of this class which may be readily attached to the towed and towing vehicles, which is very simple, which is thoroughly strong, and which will reliably actuate the steering gear of the towed vehicle and at the same time permit the relative rise and fall of the towing and towed vehicles.

Other objects will appear in the course of the following description.

My invention is illustrated in the accompanying drawings, wherein:—

Figure 1 is a top plan view of my improved towing device showing the device applied to the front axle of a towed vehicle in full lines and in dotted lines to the rear axle of the towing vehicle;

Figure 2 is a longitudinal side elevation of the towing attachment, the axles of the vehicles being shown in dotted lines;

Figure 3 is a fragmentary elevation of the forward end of the lever 14 and of the rear portion of the yoke 21, the yoke being partially in section.

Referring to these drawings, 10 designates a supporting member or transverse bar which is adapted to rest upon the front axle of the towed vehicle and which is clamped thereon by the L-shaped clamp bolts 11 which are formed at the lower end to embrace the axle which pass through perforations in the bar 10 and which are provided with nuts 12 preferably formed with cranks whereby the nuts may be manipulated readily.

Passing through this bar 10 or preferably made as part thereof as, for instance, in the nature of a stud bolt, is a pivot pin 13, and pivoted upon this pin is the steering gear actuating lever 14. This lever, therefore, may oscillate in a horizontal plane. The rear end of the lever is formed with a longitudinally extending slot 16, and disposed in this slot is a clamp bolt 17, the lower end of which is bent to embrace or partially embrace the steering rod of the towed machine and the upper end of which is screw-threaded for the reception of a nut 18 having a crank handle thereon whereby it may be readily manipulated. The forward end of this lever is extended downward and then rearward, as at 19, and the extremity of the lever is perforated for the passage of a bolt 20.

Engaging the rear axle housing of the towing vehicle is a yoke 21 which is U-shaped in plan, the cross bar of the yoke at its middle being perforated for the passage of the bolt 20 and the bent end of the lever 14 embracing this yoke at its middle, as shown clearly in Figure 3. The yoke 21, as before stated, is U-shaped or forked in a horizontal plane so as to embrace the differential housing, and the forward end of each branch or arm 22 of the yoke is downwardly and rearwardly extended, as at 23, so as to form a fixed jaw. Opposed to the fixed jaw is a fixed jaw 24, this jaw extending downward and forward to positively embrace the rear axle housing, and preferably this jaw is adjustable toward or from the fixed jaw 23 in any suitable manner. These jaws 23 and 24 embrace the rear axle housing on each side of the differential of the towing machine.

With this construction it is obvious that the towed vehicle will have its steering gear actuated so that it will trail behind the towing vehicle. Thus, for instance, if the towing vehicle turns to the right, the lever 14 will be oscillated so as to shift the steering rod of the trailing machine to the left, thus turning the steering wheels of the trailing machine so as to cause the trailing machine to turn to the right. It will be obvious that this construction is very simple, that it may be cheaply made, and that it may be applied in the manner described, and that it is very securely held to both machines.

I claim:—

A towing device for automobiles comprising a supporting bar adapted to rest upon the front axle of a towed machine and having an upwardly projecting pivot pin, L-shaped clamping bolts passing through apertures in the supporting bar and adapted to engage the axle of the towed machine and having cranked nuts thereon, a lever pivoted upon said pivot bolt for movement in a horizontal plane, the rear end of the lever being longitudinally slotted, an L-shaped clamping bolt passing through the slot in the rear end of the lever and adapted to engage the steering rod of the towed machine and having a cranked nut thereon, a yoke pivotally engaged with the forward end of the lever, said yoke being forked to accommodate the differential of the towing machine and each arm of the yoke being formed with a fixed jaw and with a movable jaw adapted to embrace the rear axle housing on each side of the differential.

In testimony whereof I hereunto affix my signature.

ANDREW J. PARCEL.